United States Patent [19]

Willett

[11] Patent Number: 4,976,600
[45] Date of Patent: Dec. 11, 1990

[54] BREAD MOLDERS

[75] Inventor: Paul E. Willett, Queensland, Australia

[73] Assignee: APV Baker Pty Ltd., Victoria, Australia

[21] Appl. No.: 367,667

[22] Filed: Jun. 19, 1989

[30] Foreign Application Priority Data

Jun. 21, 1988 [AU] Australia ............................ PI8893

[51] Int. Cl.⁵ .......................... A21C 3/02; B29C 43/46
[52] U.S. Cl. ...................................... 425/151; 425/321; 425/363
[58] Field of Search ................ 425/319, 320, 321, 322, 425/332, 333, 334, 363, 372, 373, 374, 151, 337, 238, 329, 112, 96, 153, 328, 152, 367, 448, 449; 426/500, 501, 502, 503, 496; 264/175; 99/450.1, 450.2, 450.3, 450.4, 450.5, 450.6, 450.7

[56] References Cited

U.S. PATENT DOCUMENTS

| | | | |
|---|---|---|---|
| 2,201,244 | 5/1940 | Root | 425/152 |
| 4,255,106 | 3/1981 | Anetsberger et al. | 425/151 |
| 4,276,317 | 6/1981 | Hayashi | 426/501 |
| 4,332,539 | 6/1982 | Zani | 425/151 |
| 4,375,349 | 3/1983 | Vrbanek | 425/337 |

FOREIGN PATENT DOCUMENTS 59-74942  4/1984  Japan .................... 425/238

Primary Examiner—Willard E. Hoag
Attorney, Agent, or Firm—Kimmel, Crowell & Weaver

[57] ABSTRACT

A bread moulder has a feed chute for receiving dough pieces and directing them between counter-rotating sheeting rollers for flattening the dough and delivering it to apparatus for working it between convergent runs of driven endless upper and lower belts. A shutter is hinged in the feed chute and is biased to closed position but is yieldable under impact of a dough pieces thrown onto it to allow the dough piece to pass through the feed chute. A safety gate in the form of a double grille, V-shaped in end view, is hinged to the feed chute and is movable by a handle to cause its leading part to move the shutter into the chute to dislodge any dough lodged therein, its trailing part forming a barrier before the sheeting rollers.

2 Claims, 3 Drawing Sheets

BREAD MOLDERS

BACKGROUND OF THE INVENTION (1) Field of the Invention

This invention relates to bread molders.

(2) Prior Art

A bread molder for working dough pieces normally includes a feed chute through which the dough pieces are fed manually to be received between a pair of rapidly counter-rotating sheeting rollers in adjustably spaced relationship. These sheeting rollers press and flatten the dough piece which is fed from them to an arrangement of driven belts between which the dough is worked by being rapidly rolled and compressed before being discharged to a catch tray.

A dough piece will sometimes stick to the feed chute or otherwise fail to enter cleanly between the sheeting rollers, and it may be difficult to dislodge the dough and ensure that it is properly fed between the rollers without risking a serious accident resulting from a hand being caught between the rollers.

SUMMARY OF THE INVENTION

The present invention has been devised with the general object of providing a bread molder incorporating safety means which will obviate or very greatly reduce this disadvantage.

Accordingly, the invention resides broadly in a bread molder of the type having a feed chute for receiving dough pieces and directing them between counter-rotating sheeting rollers for flattening the dough and delivering it to apparatus for working and discharging the dough, wherein a shutter is movably mounted in the feed chute and biased to closed position but is yieldable under impact from a dough piece thrown thereon to allow the dough piece to pass through the feed chute; and a safety gate is hinged to the feed chute and is movable by a handle into the feed chute so that any dough piece lodged therein is swept to the sheeting roller. The safety gate is preferably a double grille, V-shaped in end view and of which, when the safety gate is moved into the feed chute, the trailing section forms a barrier before the sheeting rollers. Other features of the invention will become apparent from the following description.

BRIEF DESCRIPTION OF THE DRAWINGS

A preferred embodiment of the invention is shown in the accompanying drawings wherein.

DETAILED DESCRIPTION OF THE PREFERRED EMBODIMENTS

Figure 1:
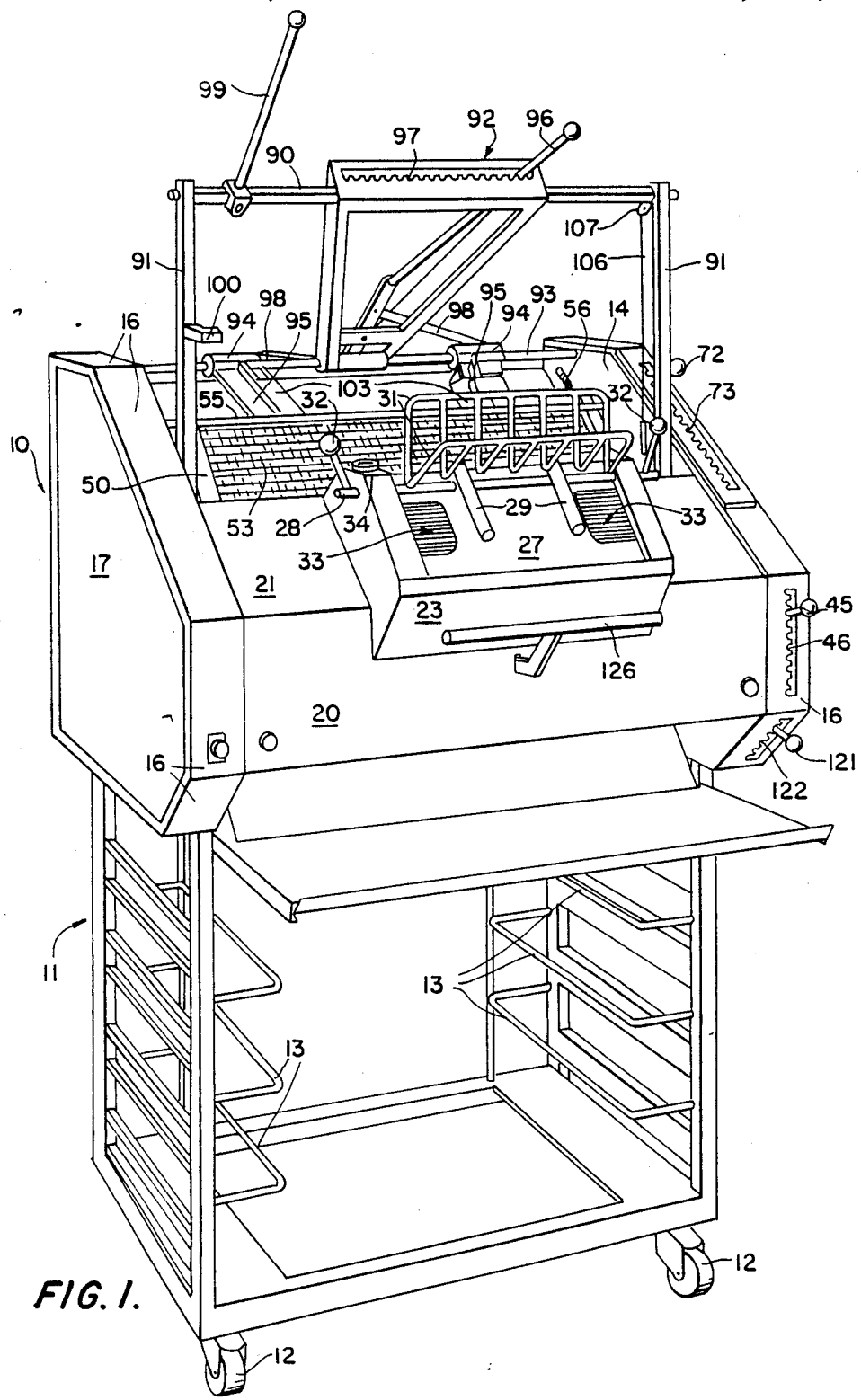
FIG. 1 is a perspective view of a bread molder according to the invention.

The bread molder illustrated has a main housing 10 fixed on a stand 11 which is mountd on castor wheels 12 and furnished with racks 13 to carry baker's trays which can be loaded with products to be baked.

The main housing includes a pair of rigidly interconnected side plates 14 and 15 which have out-turned peripheral flanges 16 to which are fixed side cover plates 17 to form side enclosures 18 and 19. Front and top panels indicated at 20 and 21 resepectively are fixed between the side plates 14 and 15.

An electric motor 22 is mounted within the main housing 10 and through various drives hereinafter described drives the several moving parts of the bread molder.

The feed chute assembly of the dough molder includes a front casing 23 fixed centrally to the front and top panels 20 and 21 of the main housing 10. This front casing contains a feed chute 24 to receive dough pieces and direct them between a pair of counter-rotating sheeting rollers 25 and 26.

The feed chute 24 is normally closed by a hinged shutter 24 pivotally mounted on a transverse shaft 28 and biased to its closed position by a torsion spring (not shown). A pair of parallel guide rollers 29 normally lie close to the shutter 27 to either side of its middle part. The shafts of the guide rollers 29 are fixed to a plate 30 hinged on top of the front casing 23 and can be raised hingedly clear of the shutter, as shown in broken outline in FIG. 5.

Fixed to the shaft of the guide rollers 29 is a safety gate 31 consisting of a double or V-shaped grille, normally spring-biased to its upright position as shown, but capable of being swung down by handles 32 on the shaft 28.

Figure 5:
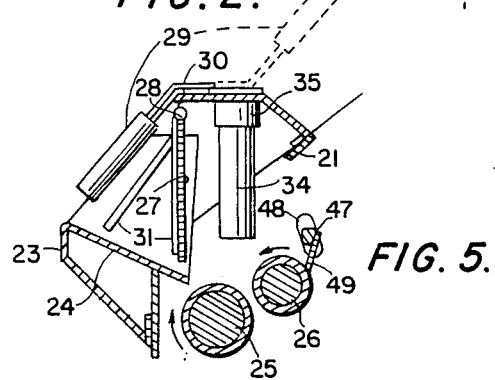
FIG. 5 is a sectional view of the feed chute assembly with the safety gate moved to its operative position.

A dough piece to be worked in the bread molder and of a size suitable for a bread loaf may be thrown onto the shutter 27 between the guide rollers 29, causing the shutter to swing to an open position so that the dough piece will pass through the chute 24 to the counter-rotating sheeting rollers 25 and 26. If the dough piece should stick to the chute or otherwise fail to enter between the sheeting rollers, the safety gate 31 may, as shown in FIG. 5, be swung down by means of either handle 32, clearing the guide rollers 29. The leading part of the grille of the safety gate moves the shutter 27 to sweep the dough piece to the feed rollers, and the trailing section of the grille is brought into such position as to form a barrier to prevent the operator of the bread molder from inserting his hand into the chute and possibly having it caught between the sheeting rollers.

If smaller dough pieces are to be worked for making bread rolls, for example, two such pieces at a time may be fed through openings 33 which are formed at both sides of the hinged shutter 27 and again if either should stick it can be cleared by operation of the safety guide as described.

If dough pieces are to be worked to make shell rolls, two elongated fingers of dough at a time may be inserted through shell roll tubes 34 held removably in sleeves 35 fixed in holes at the sides of the top of the front casing 23 and leading vertically down to the sheeting rollers 25 and 26.

Each of the sheeting rollers 25 and 26 is surfaced with rubber or the like. The front sheeting roller 25, of greater diameter than the rear roller, has a shaft 36 rotatable in bearings in blocks 37 bolted to the outer faces of the main housing side plates 14 and 15. Pivoted to these fixed blocks at 38 are a pair of hinged blocks 39 which carry the bearings for the shaft 40 of the rear and upper sheeting roller 26. A shaft 41 through both side plates 14 and 15 carries at each end a lever arm 42 connected by a J-shaped bar 43 to a hinged block 39. Within the side enclosure 18 a bifurcated lever 44 fixed on the shaft 41 carries between its arms an end of a hand-lever 45 extending through and spring-loaded into engagement with a rack 46 at one side of the front of the dough molder main housing 10. By means of the hand-lever 45 the two hinged blocks 39 may be moved in unison to move the sheeting roller 26 closer to or further from the sheeting roller 25, to adjust the thickness to which a dough piece will be pressed when passed between the two rollers.

Fixed to the two hinged blocks 39 are the ends of a transverse bar 47 movable, when the hinges blocks are pivoted, in arcuate slots 48 in the side plates 14 and 15. Between the side plates the bar 47 carries a scraper blade 49 bearing against the roller 26 to ensure that dough is parted from this roller and will fall onto a felt covered endless top belt 50 carried by a large drive or front roller 51 and a smaller idler or rear roller 52. The dough piece received on the top run of the top belt 50 is carried, in the direction indicated by an arrow in FIG. 2, under a curling chain 53 consisting of a flexible section of chain-woven metal fabric fixed at its front to a transverse bar 54 and at its rear to a transverse bar 55 tensioned by springs 56. The dough piece is rolled between the rearwardly and upwardly moving belt 50 and the curling chain 53 and is fed over the top of the belt down onto the rear upper part of the top run of a lower belt 57. The dough piece travels forwardly and downwardly between the top run of the lower belt and the bottom run of the top belt. These runs are downwardly and forwardly convergent and, as indicated by arrows in FIG. 2, they move in opposite directions. The top belt is driven faster than the lower belt, and so the dough piece, rolled rapidly and progressively compresed, proceeds downwardly and forwardly.

The lower belt 57 is carried by a lower or drive roller 58 and an upper or idler roller 59, the shafts 60 and 61 of which are carried by a belt adjustment frame indicated generally at 62. This frame includes parallel side pieces 63 with bearings for the shafts and interconnected at the front by a curved delivery plate 64. Lugs 65 extending from the upper and lower parts of each side plate 63 are pivoted to corresponding arms of bell cranks 66 fixed on upper and lower transverse shafts 67 and 68 respectively the other arms of the bell cranks being connected by connecting rods 69. Within the side enclosure 18 (see FIG. 3) there is fixed to an end of the lower shaft 68 a block 70 to which are pivoted and spring loaded the ends of a bifurcated lever 71 from the upper end of which a hand lever 72 passes through and is spring-loaded into engagement with a rack 73 in a flange 16 of the main housing 10. By operation of this hand lever, the shaft 68 may be turned in one direction or the other to act, through the bell cranks 66 and connecting rods 69, to cause the belt adjustment frame 62 and the lower belt 59 to move in parallelism towards or away from the upper belt 50.

Figures 3, 4:
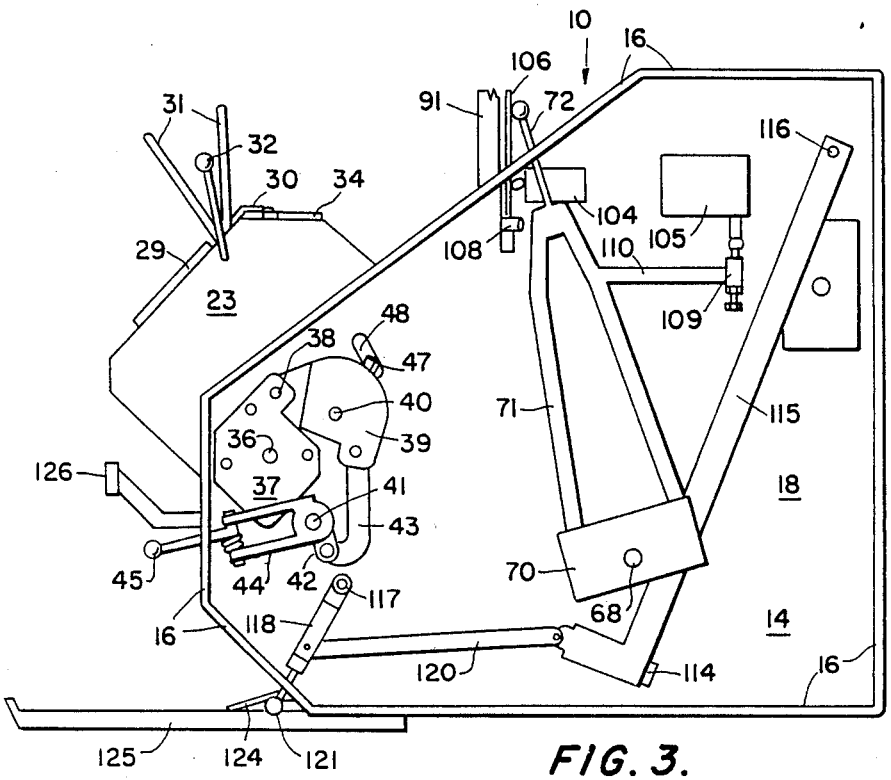
FIG. 3 is an elevational view of one side of the bread molder, a side cover plate of the main casing being removed.
FIG. 4 is a similar view of the other side of the bread molder, the other side cover plate being removed.

As shown in FIG. 4, the shaft 74 of the motor 22 carries a pulley wheel 75 which through a belt 76 drives a large pulley wheel 77 on the shaft 78 of which is a sprocket (not shown) engaging an endless chain 79 driving an idler sprocket 80; sprockets 81 and 82 on the shafts 40 and 36 of sheeting rollers 26 and 25; a sprocket 83 on the shaft 84 of the top belt drive roller 51; an idler pulley 85; a sprocket 86 on the shaft 60 of the lower belt drive roller 58, this shaft 60 passing through a slotted or oversize hole (not shown) in the side plate 15; and an idler sprocket 87 on a pivoted arm 88 acted on by a tension spring 89.

The bread molder incorporated a dough shaping device for limiting the extent to which a dough piece, rolled and compressed between the upper and lower belts 50 and 57, is permitted to lengthen. The cylindrical ends of an otherwise square-section shaft 90 are rotatable in bearings in the upper ends of a pair of standards 91 fixed to the inner faces of the side plates 14 and 15. A lift frame 92 has its front fixed on the shaft 90, and through the rear of this frame is a rod 93 on which are slidable a pair of sleeves 94, each formed integrally with a shaping side arm 95. A lever 96 fulcrumed on the lift frame 92 and spring-loaded into engagement with a rack 97 on this frame is connected by connecting rods 98 to the two sleeves 94 so that, by varying the position of the lever 96, the shaping side arms 95 may be brought closer or further apart. When the dough shaping device is not required for use, a lift lever 99 pivoted on the shaft 90 may be swung down and engaged releasably with a catch 100 on a standard 91, causing the lift frame to lift the shaping side arms 95 clear of the dough molder belts 50 and 57. When the shaping device is to be used, the lever 99 is released from the catch 100 and is raised so that the shaping side arms 95 are lowered to enter the space between the belts 50 and 57. Each of the shaping side arms 95 has extending outwardly from a position near to its distal end a shaft 101 carrying a roller 102 to contact the belts 50 and 57 and keep th shaping side arm just clear of both belts. The upper parts of the two shaping side arms are downwardly convergent; their middle parts are substantially parallel, and their lowermost parts are divergent. Lead-in plates 103 are provided on the upper parts of the shaping side arms to ensure that a dough piece discharged over the rear of the top belt 50 will be received between the two shaping side arms.

Figure 2:
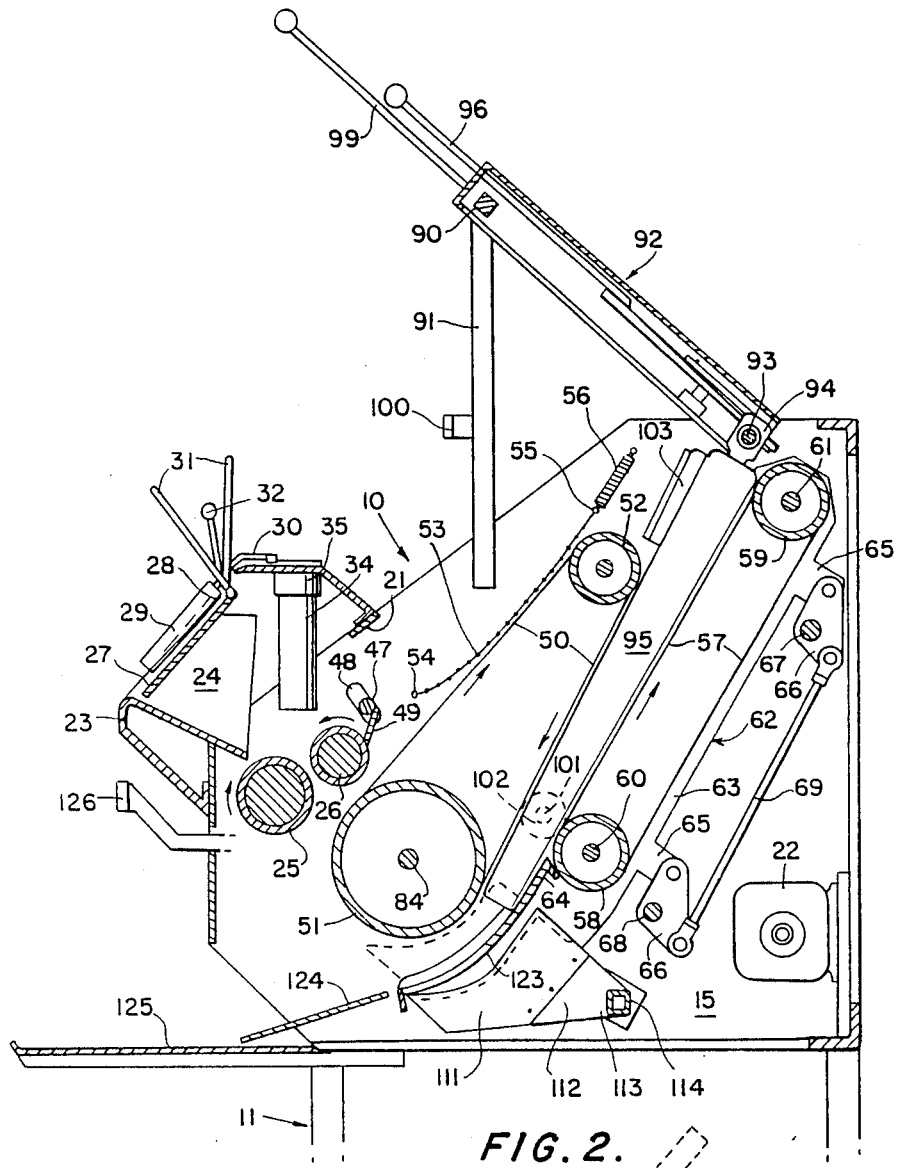
FIG. 2 is a sectional view of the major part of the bread molder shown in FIG. 1.

It is important that the shaping side arms should not be introduced between the belts 50 and 57 while these belts are too close to accommodate them and that, while the shaping side arms are in place, the lower belt 57 should not be inadvertently advanced towards the top belt 50. In either case the belts could be damaged by the shaping side arms. To avoid these possibilities, safety switches 104 and 105 are provided in the side enclosure 14 as shown in FIG. 3, and are connected in the circuit of the motor 22. A rod 106 depends from a lug 107 fixed on the square-section bar and has its lower end fixed to a switch actuator 108. When the lift lever 99 is disengaged from the catch 100 and raised to lower the shaping side arms 95 into operative position as shown in FIGS. 1 and 2, the switch actuator 108 is lowered clear of the safety switch 104 which is opened. This will bring the motor 22 to rest, unless the bifurcated lever 71 has already been moved to such a position that a switch actuator 109 on an arm 110 extending from the lever 71 is coacting with and closing the safety switch 105. Therefore if the belts 50 and 57 are not appropriately spaced, the motor 22 is automatically stopped when the lowering of the shaping side arms 95 commences; and if, while the molder is operating with the shaping side arms in operative position, the lever 71 is moved to vary the spacing between the belts 50 and 57, the motor will again be instantly stopped and the belts brought to rest.

It is often required that a dough piece worked between the belts 50 and 57, its length restricted by the shaping side arms 95, should be divided into (normally) four substantially equal pieces, for the purpose of four-piece or cross-grain moulding of a bread loaf. For this purpose, the machine includes three similar and parallel splitter blades 111. These blades are removably mounted on three blade carriers 112 fixed upon a transverse bar 113, its end passing through slotted holes 114 near to the bottom of the side plates 14 and 15 and being fixed to the lower extremities of L-shaped arms 115 of which the upper ends are pivoted, at 116, near to the upper rear parts of the side plates. A transverse shaft 117 rotatable in bearings in the side plates 14 and 15 has fixed to its ends a pair of parallel levers 118 and 119, each connected by a connecting rod 120 to the extremity of an L-shaped arm 115. From the lever 118 there extends a handle 121 which is spring-loaded into engagement with a rack 122 in a flange 16 at the lower front part of the housing 10. The handle may be operated to rotate the shaft 117 to act, through the levers 118 and 119 and the connecting rods 120 so to swing the L-shaped arms 115 that the splitter blades 111 are caused to advance substantially in parallelism from their normal inoperative position shown in FIG. 2 to their operative position shown in broken outline, passing closely through parallel slots 123 formed in the curved delivery plate 64. The leading edges of the splitter plates are sharpened, and are curved so that when fully advanced they are located clear of, but close to, the part of the belt 50 passing under the drive roller 51. Dough pieces which have been worked in the machine are discharged to the delivery plate 64 and travel gravitationally down a fixed ramp 124 onto a catch tray 125 extending from the front of the machine.

A safety bar 126 is provided at the front of the machine and, when pressed in an emergency acts through appropriate switching gear (not shown) to stop the motor 22.

It will be seen that the bread molder is very versatile in its operations, and can be used to produce a full range of bread sticks, rolls, viennas and 4-piece sandwich breads. With the shaping arms 95 lifted clear of the belts 50 and 57 the machine will work dough for making bread sticks or other breads not made in tins; when the latter are required the shaping arms 95, their spacing adjusted as required, are moved into position between the belts. If the worked dough is to be divided into sections for the production of 4-piece sandwich breads, the splitter blades 111 are brought into their advanced position. With the shaping arms 95 lifted clear, dough pieces for bread rolls may be worked two at a time by feeding them through the side openings 33 of the shutter 27. If dough is to be worked for making shell rolls, fingers of dough can be inserted lengthwise two at a time through the shell roll tubes 34, to be rolled spirally.

The provision of the shutter 27 and the safety gate 31 very greatly reduces the likelihood of a baker suffering a severe accident from catching his hand between the sheeting rollers 25 and 26, and the provision of the safety switches 104 and 105 ensure that the belts will not be damaged by insertion of the shaping arms 95 while the belts are inappropriately spaced, or by incorrect adjustment of the belt relationship while the spacing arms are in place.

The particular embodiment of the invention herein described and illustrated may, of course, be subject to modifications of constructional detail and design within the scope and ambit of th invention hereinafter claimed.

I claim:

1. A bread molder having a feed chute with an inlet for receiving dough pieces and directing them to fall between counter-rotating sheet rollers for flattening the dough and delivering it to an apparatus for working and discharging the dough, wherein:
   the feed chute has sides, a back and a front, a shaft rotatable by a handle being mounted across the back of the feed chute,
   a shutter is pivoted on th shaft, is spring-biased to a closed position extending forwards across the inlet to the feed chute and is adapted to be pivotally moved down into the feed chute under impact from a dough piece thrown manually onto the shutter to allow the dough piece to pass through the feed chute,
   two spaced parallel freely rotatable guide rollers perpendicular to the shaft are adapted to guide between them a dough piece thrown onto a central part of the shutter,
   restricted openings in the shutter to both sides of the two rollers are adapted to accept dough pieces fed in pairs through them to the feed chute and the sheeting rollers, and
   a safety gate comprising two grilles fixed to and radiating from the shaft at an acute angle to each other is adapted to be swung, by rotation of the shaft, into the feed chute, clearing the guide rollers, and causing one grille to depress the shutter into the feed to sweep to the sheeting rollers any dough piece lodged in the fed chute, the other one of the grilles at the same time moving to form a safety barrier above the sheeting rollers.

2. A bread molder according to claim 1 wherein:
   the feed chute is mounted within a casing, and a pair of vertical cylindrical feed tubes extend removably through the casing at both sides of the feed chute and towards the sheeting rollers for guiding between the sbeeting rollers elongated fingers of dough to be worked into shell rolls.

* * * * *